April 22, 1952     S. G. HARRY     2,593,879
CHICKEN AND HOG FEEDER
Filed March 10, 1950     2 SHEETS—SHEET 1
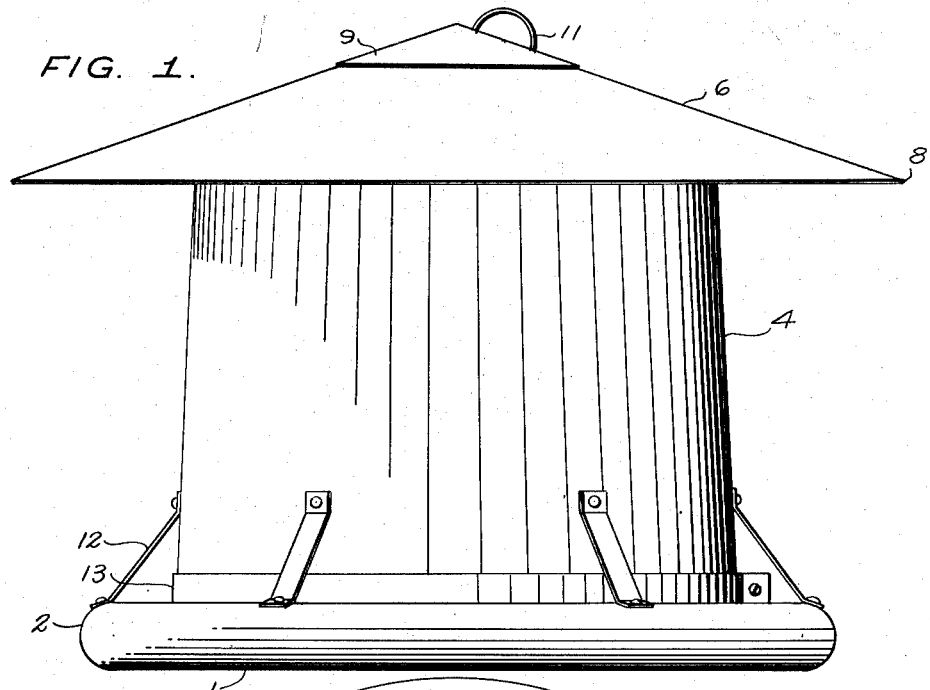
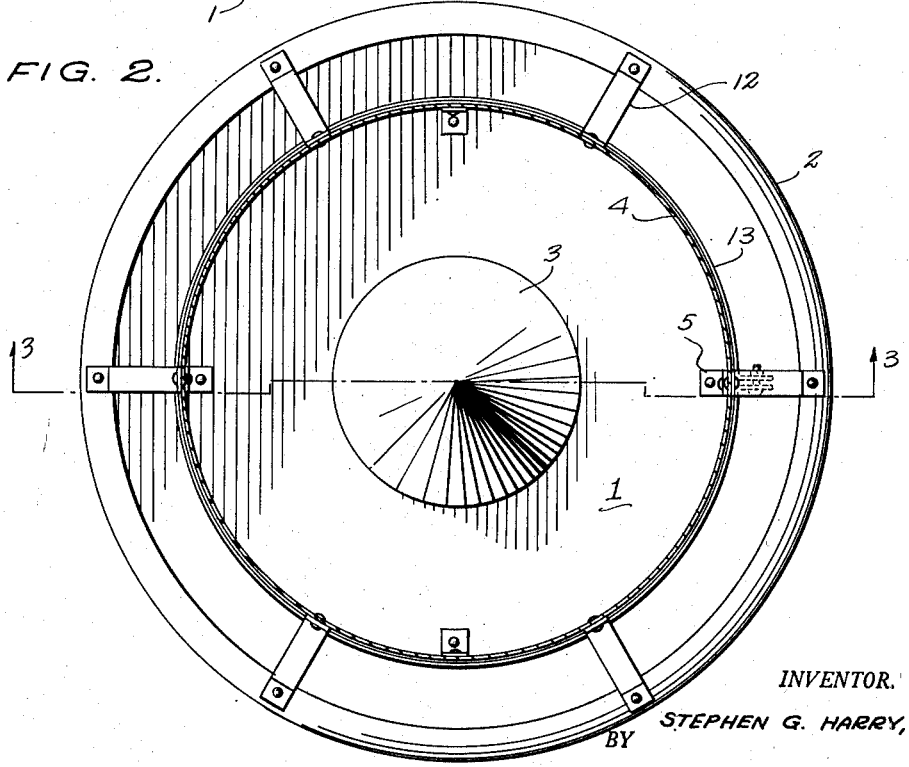
INVENTOR.
STEPHEN G. HARRY,
BY McMorrow, Berman + Davidson
ATTORNEYS

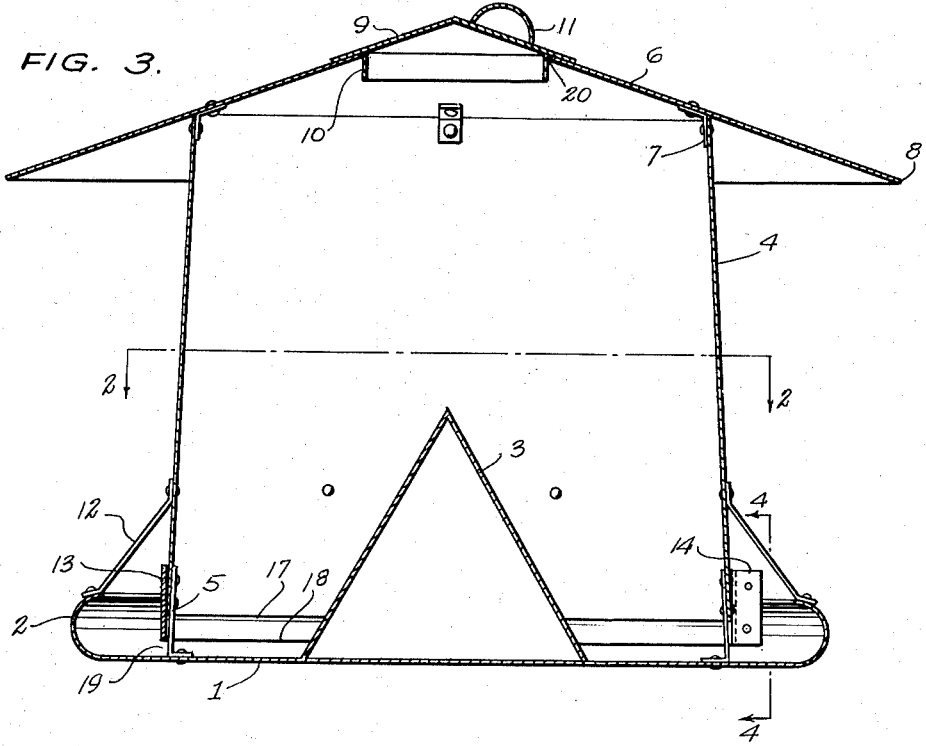
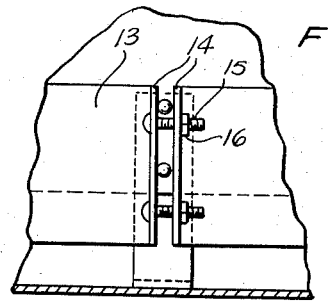
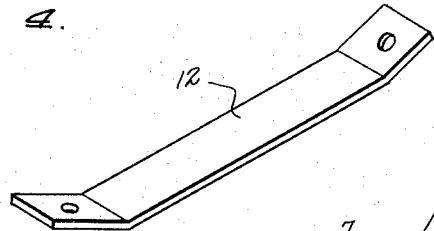
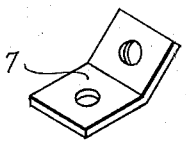
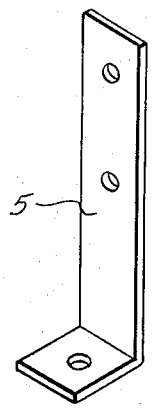

Patented Apr. 22, 1952

2,593,879

UNITED STATES PATENT OFFICE 2,593,879

CHICKEN AND HOG FEEDER

Stephen G. Harry, Cody, Wyo.

Application March 10, 1950, Serial No. 149,006

1 Claim. (Cl. 119—53)

This invention relates to stock-feeders, and particularly to an improved device adapted for feeding poultry, hogs, or other stock.

It is an object of the present invention to provide an improved hog and chicken feeder, involving a bin adapted to contain a supply of feed, which is mounted at its lower end on a feed pan to dispense feed into the feed pan automatically by gravity, the feeder being reliable and efficient in use, of simple and durable construction, and capable of being easily and cheaply manufactured.

Another object of the invention is to provide an improved means for controlling the escape of feed from the bin, so as to regulate the quantity of feed passing into the feed pan and to permit the supply of feed to be entirely cut off if desired.

A further object of the invention is to provide a feed pan having an upwardly and inwardly directed annular flange at its outer edge which will serve to prevent animals, such as hogs, from pushing the feed out of the feed pan.

A further object of the invention is to provide a conical roof member of such a diameter as to project radially well beyond the outer edge of the feed pan, so as to prevent water from dripping from the edges of the roof into the feed pan and wetting the feed and thus impeding movement of the feed from the bin to the feed pan.

Another object of the invention is to provide a storage bin circular in cross section and tapering somewhat from bottom to top, which will provide a bin in which the feed will not clog.

With these and other objects in view, as will more fully appear as the discussion proceeds, the invention consists of certain constructions, arrangements and combinations of the parts which will be hereinafter fully described and claimed.

For a full understanding of the invention, reference is to be had to the following description and accompanying drawings in which:

Figure 1 is a side elevation of the improved stock feeding device.

Figure 2 is a plan view partly in section, taken on the line 2—2 of Figure 3.

Figure 3 is a vertical section taken on line 3—3 of Figure 2.

Figure 4 is a view, partly in section, taken on line 4—4 of Figure 3.

Figures 5, 6 and 7 are enlarged detail views of bracket or brace members employed for connecting various parts of the stock feeder together.

Similar reference characters indicate corresponding parts throughout the several views in the drawing.

The present improved stock feeding device is preferably constructed of suitable sheet metal, in order to be durable and light in construction and capable of withstanding exposure to the weather.

The device includes a feed pan 1, comprising a disc portion serving as a base member, and a peripheral annular flange 2 which curves outwardly, upwardly and then inwardly from the disc portion of the feed pan.

A bin 4, circular in cross-section, and tapering slightly from the bottom to the top thereof, and substantially smaller in diameter than the pan 1, is mounted on the feed pan 1 by means of a plurality of bracket members 5. Each of the bracket members 5 has one leg thereof fastened to the disc portion of the feed pan 1 and the other leg thereof fastened to the inner surface of the lower portion of the bin so that bin is mounted on the feed pan 1 with the lower edge 17 of the bin spaced vertically from the surface of the disc portion of the feed pan 1, and concentrically spaced from the flange 2, so as to provide an annular feed trough between the flange 2 and the outer lower surface of the bin 4. The lower edge 17 of the bin is spaced below the upper edge of the flange 2 so as to define a limited feed passage.

A cover 6 of truncated, conical shape, is mounted on the upper end of the bin 4 by bracket members 7. One leg of each bracket member 7 is secured to the inner side of the bin 4, and the other leg thereof is secured to the inner surface of the cover 6. The cover 6 is provided with a center opening to enable the bin to be filled with feed. A closure member 9, having a depending annular flange 10 and a handle portion 11, is provided for closing the opening 20. The flange 10 fits within the opening 20 to hold the closure member 9 in position.

The outer peripheral edge 8 of the cover 6 extends outwardly well beyond the outer edge of the feed pan 1. This provides for protection of the feed in the feed pan from being soaked by water dripping off the edge 8. It is important that the feed remain dry, as otherwise it will not feed properly out of the bin into the feed pan.

The feed pan 1 has attached thereto centrally thereof an upstanding conical member 3 which serves as a guiding means for directing the feed toward the periphery of the feed pan. In its outward movement, the feed passes beneath the lower edge 17 of the bin to a position against the flange 2 of the feed pan 1, where it is available for feeding chickens, hogs, or other stock.

In order to control the movement of the feed from the bin to the trough portion of the feed pan, a ring member 13 is provided which surrounds the lower portion of the bin and is arranged to be clamped thereon in various vertically adjusted positions. The ring member 13 is provided at each of its ends with flanges 14. The flanges 14 are traversed by bolts 15 carrying nuts 16. The feed control ring 13 may be held in any desired vertically adjusted position on the bin by tightening the nuts 16 on the bolts 15. This provides for varying the size of the space 19 between the lower edge 18 of the ring 13 and the disc portion of the feed pan 1, so as to control the supply of feed from the bin to the feed pan. If desired, the ring 13 may be lowered into engagement with the feed pan 1, thereby entirely shutting off the supply of feed from the bin to the pan.

The brace members 12 are provided to give additional strength and rigidity to the structure. They are connected, as shown, between the lower sides of the bin and the free edges of the flange 2 on the feed pan, and serve to prevent displacement of the bin with respect to the feed pan.

In use, when the feed is poured into the bin through the aperture 20; it will be fed downwardly by gravity into the feed pan 1, the feed being directed toward the flange 2 of the feed pan by the cone 3, and passing under the lower edge 18 of the feed control ring 13. As feed is removed from the feed pan, a fresh supply of feed will be directed outwardly under the lower edge of the ring 18 by the cone 3 until the supply of the feed within the bin is exhausted.

It may be noted that the means embodied in the ring for adjustment thereof vertically of the bin is one that is operative to either reduce the diameter of the ring relative to the bin, or increase said diameter, whereby to effect a loose fit of the ring during vertical movement to selected levels of adjustment. This is highly desirable in a structure of the type stated, since oftentimes, the feed used is of fine consistency. A feed of this type tends to fill, in time, any crevices or cracks contiguous thereto. Thus, by effecting a positive increase in the diameter of the ring relative to the bin, obviously a space is defined between the ring and bin, during vertical movement of the ring to a selected level of adjustment. This allows a self-cleaning action, whereby feed lodged between the ring and the bin will drop out, thereby assuring the carrying out of the adjustment with facility at all times, while at the same time promoting ease in cleaning of the structure. This result obtains through the use of a ring broken at one location upon its periphery, to define spaced end portions thereupon provided with the flanges of 14, that are drawn toward or away from each other by the connecting bolts 15.

What is claimed is:

In a stock feeder, a feed pan involving a disc portion and an annular peripheral flange thereon, said flange curving outwardly, upwardly and then inwardly from said disc portion, a vertical substantially cylindrical feed bin, said feed bin being substantially smaller in diameter than said feed pan and overlying said feed pan and concentrically spaced from said peripheral flange so as to define a feeding trough between the side wall of the bin and said peripheral flange, circumferentially spaced brackets connected between the disc portion of the feed pan and the lower part of said bin and positioning said feed bin relative to the feed pan, said feed bin being entirely open at its lower end and having a lower edge spaced upwardly from said disc portion and spaced below the upper edge of said peripheral flange so as to define a limited passage through which feed present in the bin can move radially outwardly along the disc portion of the feed pan from the bin into the trough as feed subsides gravitationally in the bin in response to removal of feed present in the trough, said bin having a split ring circumposed on the lower part thereof, said ring having circumferentially spaced ends formed with radially outwardly extending flanges, and bolt means connecting the flanges, said bolt means being arranged to be loosened to permit expansion of the ring and free vertical adjustment of said ring from a depressed position on which the ring rests upon the disc portion of the feed pan and entirely closes said limited feed passage to an elevated position in which the lower edge of the ring is above the lower edge of the bin and said passage is entirely open, said ring being adjustable to an intermediate position in which its lower edge is below the lower edge of the bin and said passage is partly closed, said bolt means being arranged to be tightened to contract the ring upon the bin so as to maintain the ring in an adjusted position thereon.

STEPHEN G. HARRY.

REFERENCES CITED

The following references are of record in the file of this patent:

UNITED STATES PATENTS

| Number | Name | Date |
|---|---|---|
| 570,569 | Smith | Nov. 3, 1896 |
| 1,159,190 | Derr | Nov. 2, 1915 |
| 1,222,389 | Goelzer | Apr. 10, 1917 |
| 1,286,002 | Hoffman | Nov. 26, 1918 |
| 1,331,008 | Force | Feb. 17, 1920 |
| 1,485,469 | Riegel | Mar. 4, 1924 |
| 1,534,375 | Foucht | Apr. 21, 1925 |
| 1,613,985 | Dennis | Jan. 11, 1927 |
| 1,976,962 | Pape | Oct. 16, 1934 |
| 2,277,420 | Stanfield | Mar. 24, 1942 |
| 2,372,544 | Borman et al. | Mar. 27, 1945 |